July 18, 1967 — G. KOVACEVICH — 3,331,633
BABY CARRIAGE SEATS
Filed May 26, 1965 — 3 Sheets-Sheet 1
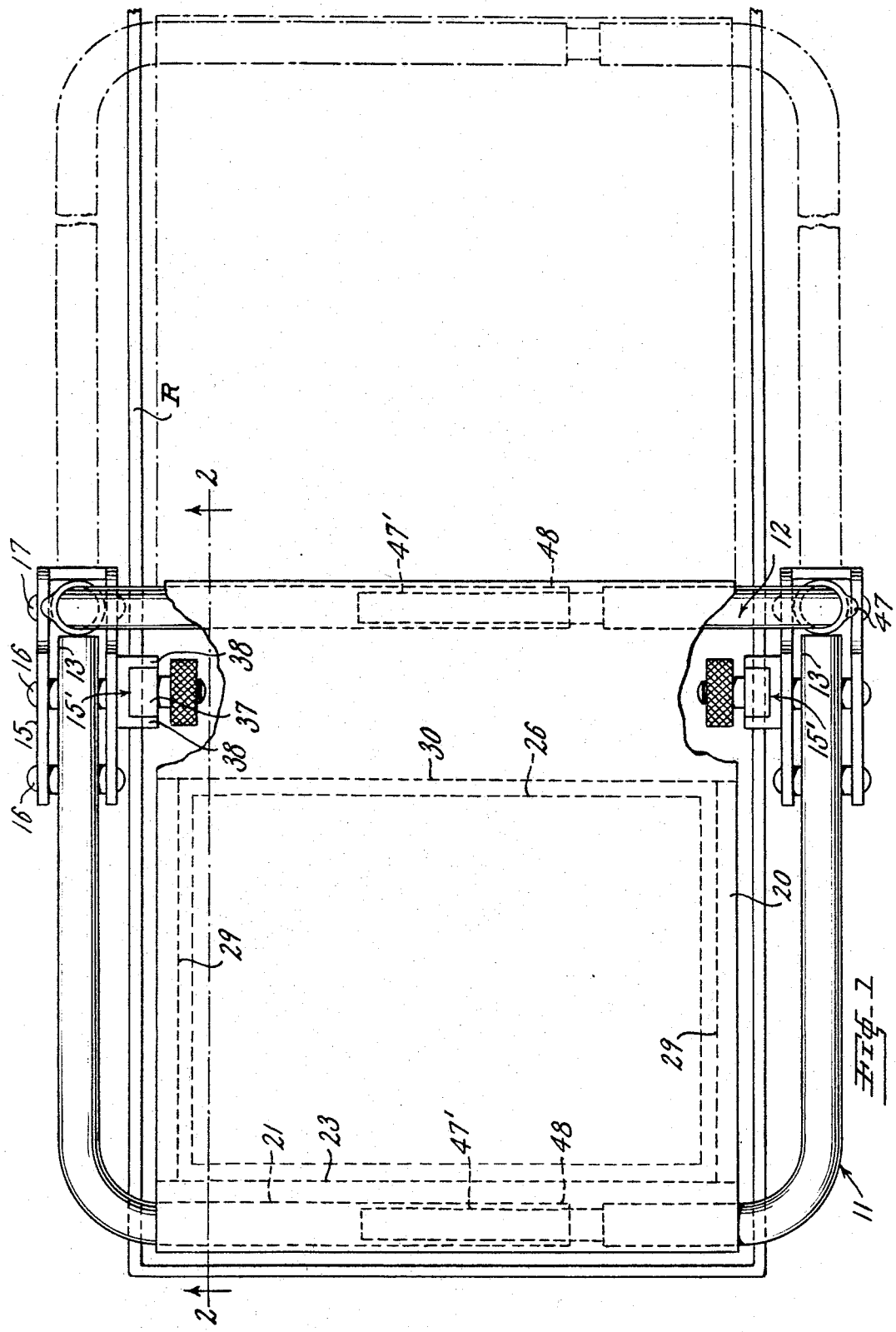

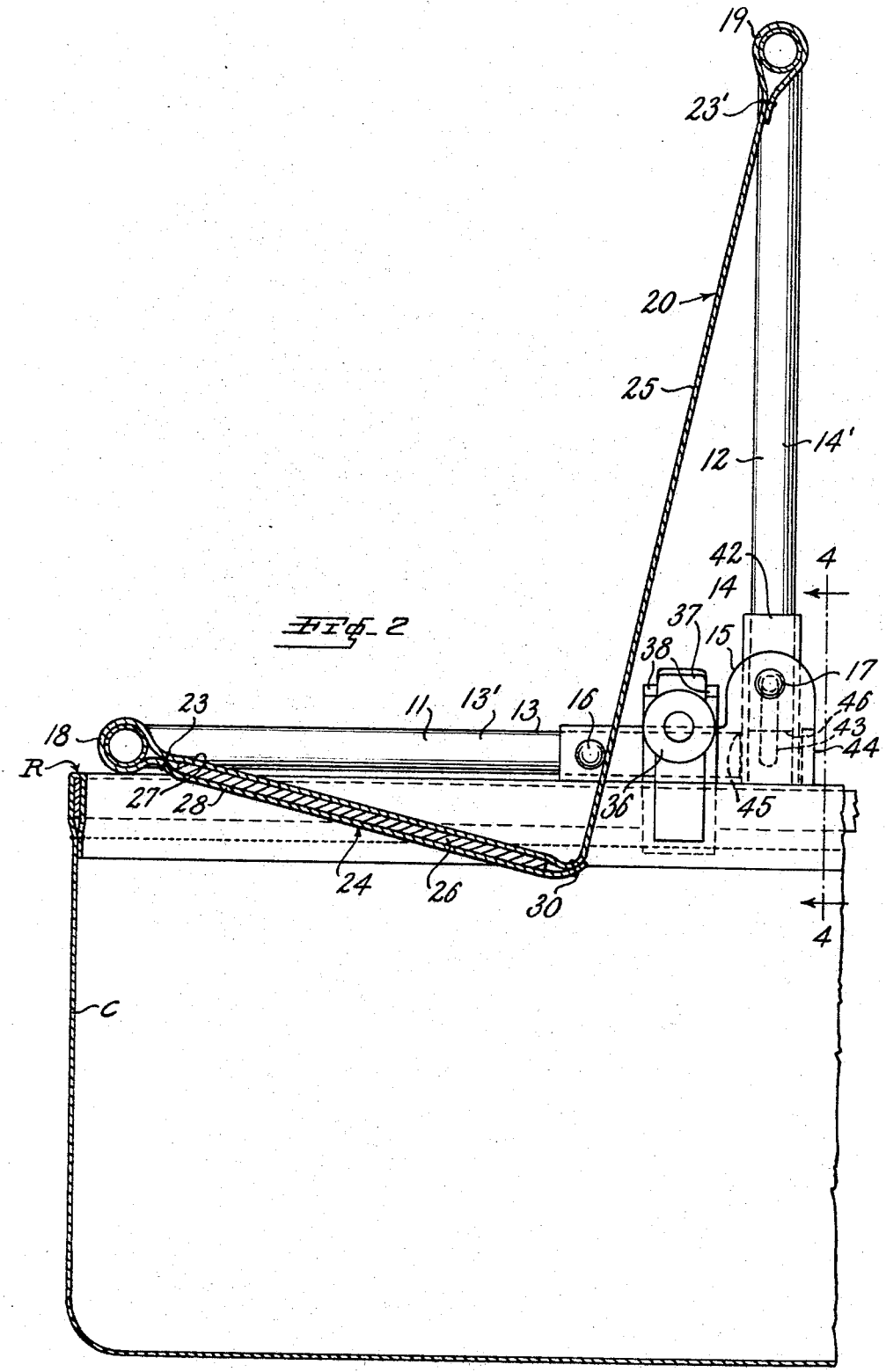

July 18, 1967 G. KOVACEVICH 3,331,633
BABY CARRIAGE SEATS
Filed May 26, 1965 3 Sheets-Sheet 3
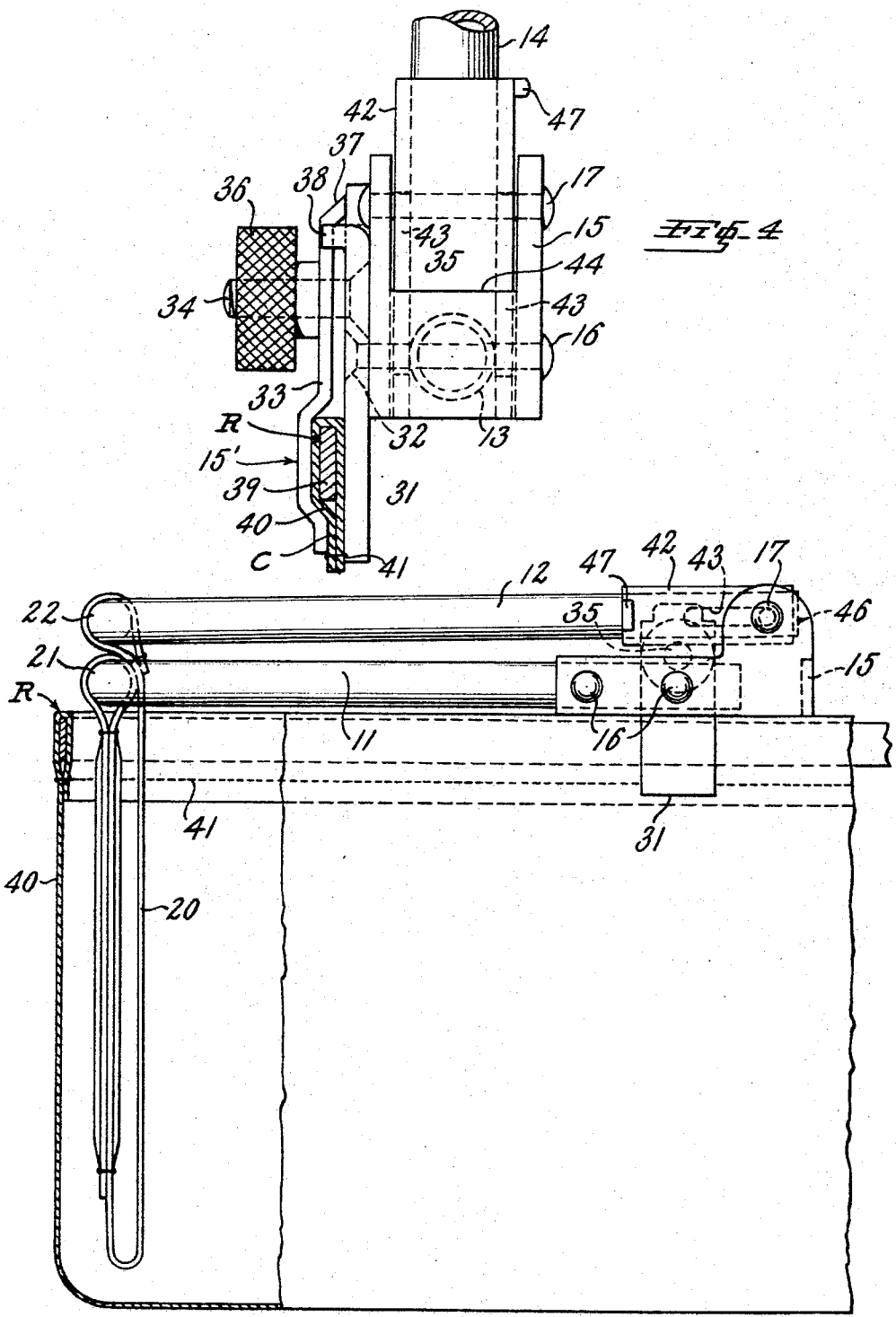

United States Patent Office 3,331,633
Patented July 18, 1967

3,331,633
BABY CARRIAGE SEATS
George Kovacevich, New York, N.Y.
(2639 211th St., Bayside, N.Y. 11360)
Filed May 26, 1965, Ser. No. 458,884
7 Claims. (Cl. 297—379)

ABSTRACT OF THE DISCLOSURE

This is an article of manufacture adapted to be attached to the top rim of a baby carriage for forming a seat to carry a child thereon in either a sitting or reclining position while another child is carried in the body of the carriage in either a sitting or reclining position. The baby carriage seat comprises a U-shaped back rest frame having its open ends pivotally attached to the open ends of a U-shaped seat frame which is adapted to be attached to the top rim of the baby carriage. A flexible strip of material is attached at its ends to the mid-portions only of the U-shaped frames to form the seat and back rest for the child. The back frame may be retained in an upright position to support the child in a sitting position. The back frame may be released and moved away from the seat frame and supported on the top rim of the carriage to support the child in a reclining position and the back frame may also be pivoted over the seat frame in a folded away position whereby the top opening of the carriage is not obstructed.

---

This invention relates to an improved baby carriage seat adapted to be supported on the top rim of the carriage. The invention relates more particularly to a baby carriage seat having a flexible seat and back supporting strip suspended between the mid-portions of a U-shaped seat frame which is adapted to be attached to the top rim of the carriage and a U-shaped back frame pivotally attached at its open end to the open end of said seat frame, and adapted to be secured in an elevated position and supported in a reclining position for carrying an older child and also in a folded away position while a younger child is carried in each instance in the body of the carriage.

Heretofore baby carriage seats have been made to be attached to the top rim of a carriage for carrying an older child while a younger child was carried in the body of the carriage. Such prior seats carried the older child only in a sitting position, and they could not be folded up so as not to encumber the top of the baby carriage. The baby carriage seat embodying the present invention is an improvement over prior baby carriage seats in that the back of the present seat is easily adjustable to carry an older baby in a sitting position, or in a reclining position and it may also be folded out of the way when the seat is not in use, so that the younger baby may be placed in and removed from the body of the carriage without interference from the seat.

The foregoing and other objects and advantages of this invention will be evident from the baby carriage seat embodying this invention described in reference to the seat illustrated in the accompanying drawings, in which:

FIG. 1 is a top plan view of the baby carriage seat attached to the portion of the baby carriage adjacent to the handle of the carriage. The seat is shown in full lines for the sitting position of the older child and with parts of the flexible back supporting and seat strip broken away and also with the back frame in dot and dash lines when it is in the reclining position for the older child;

FIG. 2 is a cross section on line 2—2 of FIG. 1;

FIG. 3 is an outside side elevational view of the seat and the portion of the carriage shown in FIGS. 1 and 2, but showing the back frame in the folded away position of the seat, and with parts of the forward portion of the baby carriage broken away and in section; and FIG. 4 is an enlarged view taken on line 4—4 of FIG. 2 of the pivotal connection between one side of the open ends of the two U-shaped seat and back frames and also showing the clamp for securing the seat frame to the carriage frame.

Referring to the drawings, the baby carriage seat 10 embodying this invention comprises an U-shaped seat frame 11 and a U-shaped back supporting frame 12. The open ends 13 and 14 of the seat frame and the back frame, respectively are pivotally connected by a bracket 15, on each side of the seat 10. The brackets 15 are secured to the legs 13' of the open end 13 of the seat frame 11 by rivets 16 and the back frame 12 is pivoted to the brackets 15 on rivets 17. The seat 10 is supported on the top rim of the baby carriage body C, and it may be secured thereto by clamps 15' attached to the brackets 15 on each side of the carriage.

The opposite ends 18, 19 of a flexible seat and back supporting strip 20 are attached to only the mid-portions 21, 22 of the seat and back frames as shown by hems in the strip within which the frames are inserted. The hems are stitched with lines of stitches 23, 23'. When the back frame 12 is in the position shown in FIG. 2, the older or extra child sits on the seat portion 24 of the strip 20 with its legs extending over the end of the carriage and the back portion 25 of the strip supports the back of the child. The seat portion 24 is provided with a stiffener or board 26 which is sandwiched between the upper layer 27 and a bottom layer 28 of the strip 20. The bottom layer 28 is formed by extending the edge of the hem at the end 18 of the strip 20. The board 26 is retained in the pocket formed between the layers 27 and 28 by opposite side lines of stitches 29 and the opposite hem stitching 23 and a line of stitches 30 which secures the end of the bottom layer 28 to the top layer 27.

An enlarged view of one of the clamps 15' for securing the seat 10 to the top rim R of the carriage body C is shown in FIG. 4, which is taken on line 4—4 of FIG. 2. Each clamp 15' comprises a plate 31 which is riveted to the bracket 15 by the rear rivet 16 which also secures the bracket 15 to the open end 13 of the seat frame member 11.

The inside head 32 of the rivet 16 is counter sunk into the plate 31. The top rim R of the carriage body C is clamped between the plate 31 and a gripping plate 33, which is slidably mounted on a spindle 34 affixed to the plate 31. As shown the spindle is provided with a head 35 which is counter sunk into the plate 31. The spindle extends through an opening in the plate 31 and is secured therein with a pressed fit. The end of the spindle extending through the plate 31 and 33 is provided with screw threads which receive an internally threaded thumb nut 36. The upper end 37 of plate 33 is bent towards the plate 31 and is received between two guide arms 38 extending from the top of plate 31. The upper end 37 of the plate 33 rests upon the upper end of the plate 31. The lower end of the plate 33 is pivoted about the upper end 37 by the thumb nut 36 to clamp the rim R between the plates 33 and 31. As shown the rim R of the carriage body is provided with a metal bar reinforcement 39 and the body C of the carriage is made of textile fabric 40 which extends around the bar 39 and is stitched together by a line of stitches 41 to form a hem which encloses the bar 39.

The back frame 12 is held in its elevated position as shown in FIG. 2 by sleeves 42 which surround each leg 14' of the open end 14 of the back frame 12 and are adapted to extend into wells formed between the brackets 15 and the termini of the legs 13' of the seat frame 11.

The sleeves 42 have a limited slidable lengthwise movement on the legs of the back frame 12. The rivet 17 extends through slots 43 on opposite sides of each sleeve 42 and the ends of the slot strike against the rivet 17 when the sleeve 42 is moved to the limit of its movement in each direction. When the sleeves are extended downward to the limit of their movement, as shown in FIG. 2, the ends of the sleeves are positioned in the wells between the termini of the legs 13' of the open end 13 of the seat frame and the closed ends 44 of the brackets 15 and thereby prevent the back frame 12 from pivoting about the rivet 17.

The legs 14' of the open end 14 of the back frame 12 terminate above the upper end 45 of the diameter of the legs 13' of the open end 13 of the seat frame 11, as indicated by the dotted line 46. When the sleeves 42 are moved to their upper limit, their lower ends are located above the termini 46 of the legs of the open end 14 of the back frame 12. The sleeves 42 are operated by grasping the tabs 47 thereon. When the sleeves 42 are in their upper positions the back frame 12 can be pivoted to its dot and dash position as shown in FIG. 1 to provide a support for the older child in a reclining position. Or, the back frame can be pivoted in the opposite direction to the position shown in FIG. 3 where the seat is in a folded away position so that it does not substantially encumber the top opening of the carriage within the rim R.

When the seat 10 is in the folded away position, as shown in FIG. 3, the back frame 12 is positioned above and substantially parallel to the seat frame 11. The mid-portion 22 of the back frame 12 is supported on the mid-portion 21 of the seat frame 11 at the end of the carriage body C and the seat and back supporting strip 20 is neatly folded down into the body C out of the way.

The length of the mid-portions 21 and 22 of the seat frame 11 and the back frame 12 are adjustable to accommodate the seat to carriages of different widths. For that purpose, where the seat and back frames 11 and 12 are made of tubular material as shown herein, the mid-portion of each frame is composed of two pieces which are made to telescope by reducing the diameter of the end 47' of one piece so that it slidably fits into the internal diameter of the end 48 of the other piece.

It is to be understood that changes may be made in the construction of the preferred form of the invention shown and described herein without departing from the spirit of the invention and it is intended to cover such changes which fall within the scope of the appended claims.

Having thus described my invention, what I claim and desire to protect by Letters Patent is:

1. A baby carriage seat comprising a U-shaped seat frame and a U-shaped back frame having their open ends pivotally attached to each other, a strip of flexible material attached only to and extending between the mid-portions of said U-shaped frames forming a seat and back rest for a child, means for supporting said seat frame on the frame of the carriage, means for securing said back frame in an elevated back rest position, and means for releasing said back frame securing means and pivoting said back frame towards or away from said seat frame, means for supporting said back frame on said carriage rim when pivoted away from said seat frame and into a reclining position for the child, and means for supporting said back frame on said seat frame when pivoted towards said seat frame into a folded away position whereby said flexible material is extended downwardly into the end of said carriage and the top opening of said carriage is not substantially obstructed by said seat.

2. A baby carriage seat comprising a U-shaped seat frame and a U-shaped back frame having their open ends pivotally attached to each other, a strip of flexible material attached only to and extending between the mid-portions of said U-shaped frames forming a seat and back rest for a child, means for removably clamping said seat frame to the top rim of the carriage, means for securing said back frame in an elevated back rest position, and means for releasing said back frame securing means so that said back frame may be pivoted toward either end of said carriage and supported by the frame of said carriage at the end of either pivotal movement.

3. A baby carriage seat comprising a U-shaped seat frame and a U-shaped back frame having their open ends pivotally attached to each other, a strip of flexible material attached only to and extending between the mid-portions of said U-shaped frames forming a seat and back rest for a child, means for supporting said seat frame on the top rim of the frame of the carriage, means for securing said back frame in an elevated position to support the back of the child, means for releasing said back frame securing means and pivoting said back frame towards or away from said seat frame, means for supporting said back frame on said carriage rim when pivoted away from said seat frame and into a reclining position for the child, and means for supporting said back frame on said seat frame when pivoted towards said seat frame into a folded away position whereby said flexible material is extended downwardly into the end of said carriage and the top opening of said carriage is not substantially obstructed by said seat.

4. A baby carriage seat for carrying an additional child on a baby carriage comprising a U-shaped seat frame and a U-shaped back frame, a strip of flexible material extending between and having its ends attached only to the mid-portions of said U-shaped frames, a bracket attached to the end of each leg of said U-shaped seat frame, means for pivotally connecting the ends of the legs of the U-shaped back frame to said brackets for a substantially 180° pivotal movement, means for securing said U-shaped back frame in an elevated position on said brackets to form said strip of flexible material into a seat and back rest for the child, means for releasing said back frame securing means and pivoting said back frame towards or away from said seat frame, means for supporting said back frame on said carriage rim when pivoted away from said seat frame and into a reclining position for the child, and means for supporting said back frame on said seat frame when pivoted towards said seat frame into a folded away position whereby said flexible material is extended downwardly into the end of said carriage and the top opening of said carriage is not substantially obstructed by said seat.

5. A baby carriage seat comprising a U-shaped seat frame and a U-shaped back frame having their open ends pivotally attached to each other, a strip of flexible material attached to and extending between the mid-portions of said U-shaped frames forming a seat and back rest for a child, means for securing said seat frame to the top rim of the frame of the carriage, means for adjusting the length of the mid-portions of said seat and back frames to accommodate baby carriages of different widths, means for securing said back frame in an elevated position to support the back of the child, means for releasing said back frame securing means whereby said back frame may be pivoted towards either end of said carriage and supported in a substantially horizontal position at the end of said pivotal movement by the top rim of said carriage.

6. A baby carriage seat for carrying an additional child on a baby carriage comprising a U-shaped seat frame and a U-shaped back frame, a strip of flexible material extending between and having its ends attached to the mid-portions of said U-shaped frames, said mid-portions of said seat and back frames being adapted to telescope one within the other for adjusting said carriage seat to carriages of different widths, a bracket attached to the end of each leg of said U-shaped seat frame, means for pivotally connecting the ends of the legs of the U-shaped back frame to said brackets for a substantially 180° pivotal movement, means for securing said U-shaped back frame in an elevated position on said brackets to form said strip of flexible material into a seat and back rest for the child, means for releasing said back frame securing means whereby said back frame may be pivoted toward either end of said carriage and supported at the end of each pivotal movement by the top rim of said carriage.

7. A baby carriage seat for carrying an additional child on a baby carriage comprising a U-shaped seat frame and a U-shaped back frame, a strip of flexible material extending between and having its ends attached to the mid-portions of said U-shaped frames to form a seat and a back rest for said child, a bracket on each side of said seat for pivotally connecting the ends of the legs of said frames together, each of said brackets having two horizontal sides between which an end of a leg of said seat frame is secured, each of said brackets having two sides extending upwardly from said horizontal side and between which an end of a leg of said back frame is pivoted on a pin, each end of said legs of said back frame having a slidable sleeve thereon adapted to be moved downwardly to lock said back frame in an elevated position and to be moved upwardly to permit said seat frame to be moved in either direction.

References Cited

UNITED STATES PATENTS

| | | | |
|---|---|---|---|
| 1,721,366 | 7/1929 | Blackstrom | 297—379 X |
| 1,849,017 | 3/1932 | Oliver | 297—357 |
| 2,089,867 | 8/1937 | Welch | 297—357 |
| 2,264,383 | 12/1941 | Kleiberg | 297—379 |
| 2,281,341 | 5/1942 | Turner | 297—457 |
| 2,939,518 | 6/1960 | Krone et al. | 297—457 |
| 3,271,071 | 9/1966 | Tabor | 297—375 |

DAVID J. WILLIAMOWSKY, *Primary Examiner.*

FRANK B. SHERRY, *Examiner.*

G. O. FINCH, *Assistant Examiner.*